(12) United States Patent
Taylor et al.

(10) Patent No.: US 9,700,035 B2
(45) Date of Patent: Jul. 11, 2017

(54) LEADERLESS QUICK RELEASE FISHING ASSEMBLY

(71) Applicant: TAYLOR LIVERANCE OLSON, LLC, Beaufort, SC (US)

(72) Inventors: Ross L. Taylor, Beaufort, SC (US); Michael Charles Liverance, Plano, TX (US); Erik Leonard Olson, Bluffton, SC (US)

(73) Assignee: TAYLOR LIVERANCE OLSON, LLC, Beaufort, SC (US)

( * ) Notice: Subject to any disclaimer, the term of this patent is extended or adjusted under 35 U.S.C. 154(b) by 0 days.

(21) Appl. No.: 14/507,426

(22) Filed: Oct. 6, 2014

(65) Prior Publication Data
US 2015/0020433 A1    Jan. 22, 2015

Related U.S. Application Data (63) Continuation of application No. 13/933,654, filed on Jul. 2, 2013, now abandoned, which is a continuation of application No. 12/718,268, filed on Mar. 5, 2010, now Pat. No. 8,615,920.

(51) Int. Cl.
| | | |
|---|---|---|
| *A01K 85/16* | (2006.01) | |
| *A01K 91/04* | (2006.01) | |
| *A01K 85/00* | (2006.01) | |

(52) U.S. Cl.
CPC .............. *A01K 91/04* (2013.01); *A01K 85/00* (2013.01); *A01K 85/16* (2013.01); *Y10T 403/7031* (2015.01)

(58) Field of Classification Search
CPC ........ A01K 85/00; A01K 85/12; A01K 85/16; A01K 85/18; A01K 91/04
USPC ........... 43/42.09, 42.24, 42.26, 42.28, 42.36, 43/42.39, 42.49; 403/322.2, 321; 279/75, 905
IPC ....................... A01K 85/00,85/12, 85/16, 85/18
See application file for complete search history.

(56) References Cited

U.S. PATENT DOCUMENTS

| | | | |
|---|---|---|---|
| 2,305,234 A | 12/1942 | Bratz | |
| 2,315,048 A | 3/1943 | Croft | |
| 2,465,064 A | 3/1949 | Colosimo | |
| 2,552,248 A | 5/1951 | Zavod | |
| 2,554,342 A * | 5/1951 | O'Callaghan | .......... A01K 85/12 384/547 |
| 3,009,279 A * | 11/1961 | Jacobson | ............... A01K 85/18 43/42.09 |
| 3,091,050 A | 5/1963 | Metzler | |
| 3,359,674 A | 12/1967 | Strumor | |
| 3,430,305 A * | 3/1969 | Geffner | ................ B64D 17/383 24/603 |
| 4,177,598 A | 12/1979 | Jolley | |
| 4,418,492 A | 12/1983 | Rayburn | |

(Continued)

OTHER PUBLICATIONS

The International Search Report and the Written Opinion received from the International Searching Authority (ISA/US) for International Application No. PCT/US2011/027227, dated Apr. 27, 2011, 10 pages.

*Primary Examiner* — Lisa Tsang (57) ABSTRACT

A saltwater fishing assembly includes a body resembling a forage fish. The body includes a quick connect device that is swivelable relative to a fishing line and is reelable to a fishing rod tip. A quick connection subassembly is connectable to the quick connect device of the body and includes a hook and is releasable with a hooked fish. Methods of using the fishing assembly are also provided.

15 Claims, 4 Drawing Sheets

(56) References Cited

U.S. PATENT DOCUMENTS

| | | | |
|---|---|---|---|
| 4,429,481 | A | 2/1984 | Handa |
| 4,472,903 | A | 9/1984 | Hutson |
| 4,615,136 | A | 10/1986 | Bank |
| 4,644,681 | A | 2/1987 | Hutson |
| 4,691,468 | A | 9/1987 | Fernbach |
| 4,696,125 | A | 9/1987 | Rayburn |
| 5,113,608 | A | 5/1992 | Hook |
| 5,241,774 | A | 9/1993 | Rayburn |
| 5,299,379 | A | 4/1994 | Hawk |
| 5,301,454 | A | 4/1994 | Chen |
| 6,327,808 | B1 | 12/2001 | Zascavage |
| 6,393,756 | B1 | 5/2002 | Forney et al. |
| 6,711,848 | B1 | 3/2004 | Gammieri |
| 7,162,830 | B2 | 1/2007 | Sims |
| 7,513,075 | B2 * | 4/2009 | Garber .................. A01K 91/03 403/112 |
| 2003/0056423 | A1 | 3/2003 | Baucom |
| 2006/0016118 | A1 | 1/2006 | Zuk |
| 2007/0227059 | A1 | 10/2007 | Cox et al. |
| 2008/0222939 | A1 | 9/2008 | Smith et al. |
| 2009/0110477 | A1 | 4/2009 | Seger |

\* cited by examiner

LEADERLESS QUICK RELEASE FISHING ASSEMBLY

CROSS-REFERENCE TO RELATED APPLICATIONS

This application claims priority to U.S. patent application Ser. No. 12/718,268, filed Mar. 5, 2010, entitled Leaderless Quick Release Fishing Assembly, to inventors Ross Langdon Taylor et al., the contents of which are incorporated by reference herein in their entirety.

BACKGROUND OF THE DISCLOSURE

A fisherman typically attaches a fishing lure to an end of a fishing line extending from a fishing rod and reel. To attract fish, the fishing lure is designed to resemble and move like the prey of the targeted fish. Specifically, the fishing lure attracts the attention of the fish through movement, vibration, color, and the like. The fishing lure is equipped with one or more single, double, or treble hooks that are used to hook the fish when it attacks the lure.

Saltwater pelagic fish, specifically epipelagic fish, inhabit the epipelagic zone of the sea. The epipelagic zone is the water from the surface of the sea down to 200 meters. Epipelagic fish can be broadly divided into small forage fish, and larger predator fish which feed on the smaller forage fish.

The standard angler arrangement for game fishermen wishing to lure and catch the larger predator fish includes, in the following order, a rod/reel, fishing line, a "Bimini Twist", a swivel, fluorocarbon, a lure and a hook.

The International Game Fish Association (IGFA) has a rule directed to epipelagic fishing: "The length of the leader is the overall length including any lure, hook arrangement or other device. The leader must be connected to the line with a snap, knot, splice, swivel or other device. There are no regulations regarding the material or strength of the leader. Saltwater species: In all line classes up to and including 20 lbs. {10 kg}, the leader shall be limited to 15 feet {4.57 meters}. The combined length of the double line and leader shall not exceed 20 feet {6.1 meters}. The leader on all classes of tackle over 20 lb {10 kg} shall be limited to 30 feet {9.14 meters}. The combined length of the double line and leader shall be limited to 40 feet {12.19 meters}."

The "leader" referenced by the IGFA rule is the arrangement between the standard fishing line and the hook. As stated, it includes the leader, a double line, and any lure, hook arrangement, or other device.

As briefly introduced above, the double line is commonly referred to as the "Bimini Twist" in IGFA tournament fishing. Typically, when a pelagic predator fish is reeled near the capturing vessel, it becomes frightened and will run (swim away from the boat), perhaps several times, before the fish can be captured. As the IGFA also has rules on line strength for certain types of fish targeted in tournaments, the Bimini Twist provides extra strength in the moment that a fish might turn to flee and is therefore regulated within IGFA rules. The movement of a fish trying to run creates a snap force that could break the leader/line combination. This movement requires the aforementioned extra strength in the Bimini Twist.

Although the Bimini Twist is included in the leader length (along with any lure, hook arrangement, etc.), the bulk of the leader is usually a form of fishing line called fluorocarbon, or a less expensive monofilament line. Fluorocarbon fishing line is made of the fluoropolymer PVDF and is valued for its refractive index, which is similar to that of water, making it less visible to fish.

A common fishing swivel usually connects the double line and the fluorocarbon (followed by the associated lure, hook arrangements, etc.). In essence, the swivel connects the fishing line to the hook. A swivel cannot be spooled onto a reel. Therefore, when an angler reels a hooked fish, the nearest an angler can reel in the fish would be to the swivel. Referencing the IGFA leader rule, that can mean that there may be as much as 30 feet of leader assembly in the water.

From here forward, the term "leader" will refer specifically to the fluorocarbon. The most efficient use of the leader and its length is a critical decision for epipelagic anglers. Roughly 90% of all hooked fish that are not captured are lost at the boat while the mate (the assistant to the boat captain and the angler) is "leadering" the fish to the boat.

"Leadering" is a term used to describe the mate's activities in recouping the final 30 feet of fishing line with a potential fish on the hook. Typically, the mate is required to pull the leader in by hand as the angler is only able to reel the fishing line onto the reel/spool up to the swivel, which leaves as much as 30 feet of line in the water upon which the fish is putting tension. This typically presents the following issues. First, the leader can become bundled up at the mate's feet, causing him to be in danger of the leader getting caught around his feet, especially if the fish runs. Second, more often than not, in order to get a proper grip on the wet leader, the mate will wrap the leader around his hand a couple of times to get the fish closer. Again, if the fish decides to run, the mate could injure this hand and also be dragged into the water. In extreme cases, the mate can be caught tightly enough in the line that he will be forced under water and drown. Third, the time associated with this technique causes further fatigue and shock to the hooked fish. The chance of the survival of the fish diminishes, if the fish is too tired to run from potential prey upon release. Fourth, additional danger, time, and fatigue are involved, while the mate removes the hook from the mouth of the fish.

What is needed in the fishing industry is a fishing lure assembly that permits the angler to reel the fish completely to the side of the boat, and to the rod tip such that a mate no longer has to manually "leader" the fish to the boat. The desired fishing lure assembly should be cost effective and relatively easy to manufacture and use.

BRIEF SUMMARY OF THE DISCLOSURE

The present disclosure is directed in general to a fishing assembly that eliminates the need for a swivel as an intermediate connection. The fishing assembly incorporates a swivel that is part of an interchangeable head of a lure or to which the head is attachable. Thus, the standard leader is eliminated by instead connecting the fluorocarbon line directly to a lure to allow an angler to reel in the entire fishing assembly.

For example, in one embodiment according to the present disclosure, a leaderless fishing assembly for use with a rod and reel may include a lure portion having a first end and a second end, each of the first and second ends having a quick release fitting, the first end being disposed in a direction of a rod tip and the second end being disposed opposite the first end in a direction away from the rod tip; a first quick connection subassembly connectable to the quick release fitting of the first end, the first quick connection subassembly being configured to swivel and being reelable to the rod tip; and a second quick connection subassembly connectable to the quick release fitting of the second end, the second quick connection subassembly having a hook and being releasable with a hooked fish. The lure portion may include a body appearing as prey for a predator fish.

In this aspect, the quick release fitting of the first end may be a male fitting having a race defined therein. The first quick connection subassembly may be rotatable relative to the male fitting. Also in this aspect, the quick release fitting of the second end may be a female fitting having a spring constant, and may include one or more ball bearings disposed therein. The quick release fittings may be located at opposite ends of a shaft, the shaft being positioned within the lure portion between the respective quick release fittings.

The first quick connection subassembly in this embodiment may also include a collar having a spring constant. The collar may be movable to release or attach the lure portion. Similarly, the quick release fitting of the second end of the lure portion may include a collar having a spring constant, and the collar may be movable to release or attach the second quick connection subassembly.

In another embodiment, a saltwater fishing assembly may include a body configured to resemble a prey fish, the body being swivelable relative to a fishing line and reelable to a fishing rod tip, the body having a quick connect device; and a quick connection subassembly being connectable to the quick connect device of the body, the quick connection subassembly having a hook, the quick connection subassembly being releasable from the quick connect device of the body for release with a hooked fish.

The quick connect device of the body of this saltwater fishing assembly may include a collar having a spring constant. The collar may be pulled away from a mouth of the hooked fish to release the hooked fish with the quick connection subassembly.

Also in this aspect of the disclosure, the quick connection subassembly may be a male connection and the quick connect device of the body may be a female connection. The quick connect device of the body may include one or more ball bearings, and the quick connection subassembly may include a race. The ball bearing may have a spring constant urging the ball bearing into the race to hold the body and the quick connection subassembly together.

In a further embodiment of the disclosure, a fishing assembly for use with a rod and reel may include a lure portion having a first end and a second end, each of the first and second ends having a quick release fitting, the first end being disposed in a direction of a rod tip and the second end being disposed opposite the first end in a direction away from the rod tip; a first quick connection subassembly connectable to the quick release fitting of the first end, the first quick connection subassembly having means for swivelling, the means for swivelling being reelable to the rod tip; and a second quick connection subassembly having means for connecting a hook to the quick release fitting of the second end of the lure portion.

The means for swivelling may be a ball bearing rotatable relative to the lure portion. The ball bearing may be positioned between a movable collar of the first quick connection subassembly and a race defined in the quick release fitting of the first end. The means for swivelling may preclude the need for a leader.

The means for connecting may be a male quick connect device defining a race therein, and the quick release fitting of the second end of the lure portion may have one or more ball bearings that can roll about the race.

The disclosure also provides methods of fishing without requiring a leader assembly. For instance, the method may include providing a lure portion having a first end and a second end, each of the first and second ends having a quick release fitting, the first end being disposed in a direction of a rod tip and the second end being disposed opposite the first end in a direction away from the rod tip; providing a first quick connection subassembly connectable to the quick release fitting of the first end, the first quick connection subassembly being configured to swivel and being reelable to the rod tip; connecting the first quick connection subassembly to a fishing line depending from the rod tip; and providing a second quick connection subassembly connectable to the quick release fitting of the second end, the second quick connection subassembly having a hook and being releasable with a hooked fish.

The method may also include steps of reeling the first quick connection subassembly to the rod tip and actuating the second quick connection subassembly to release the hook with the hooked fish.

The method may include replacing the second quick connection subassembly.

The method may further include separating the first quick connection subassembly from the quick release fitting of the first end of the lure portion and replacing the lure portion.

Additional objects and advantages of the present subject matter are set forth in, or will be apparent to, those of ordinary skill in the art from the detailed description herein. Also, it should be further appreciated that modifications and variations to the specifically illustrated, referenced, and discussed features and elements hereof may be practiced in various embodiments and uses of the disclosure without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

It is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

DETAILED DESCRIPTION OF THE DISCLOSURE

Detailed reference will now be made to the drawings in which examples embodying the present subject matter are shown. The detailed description uses numerical and letter designations to refer to features of the drawings. Like or similar designations of the drawings and description have been used to refer to like or similar parts of various exemplary embodiments.

The drawings and detailed description provide a full and written description of the present subject matter, and of the manner and process of making and using various exemplary embodiments, so as to enable one skilled in the pertinent art to make and use them, as well as the best mode of carrying out the exemplary embodiments. However, the examples set forth in the drawings and detailed description are provided by way of explanation only and are not meant as limitations of the disclosure. The present subject matter thus includes any modifications and variations of the following examples as come within the scope of the appended claims and their equivalents.

Figure 1:
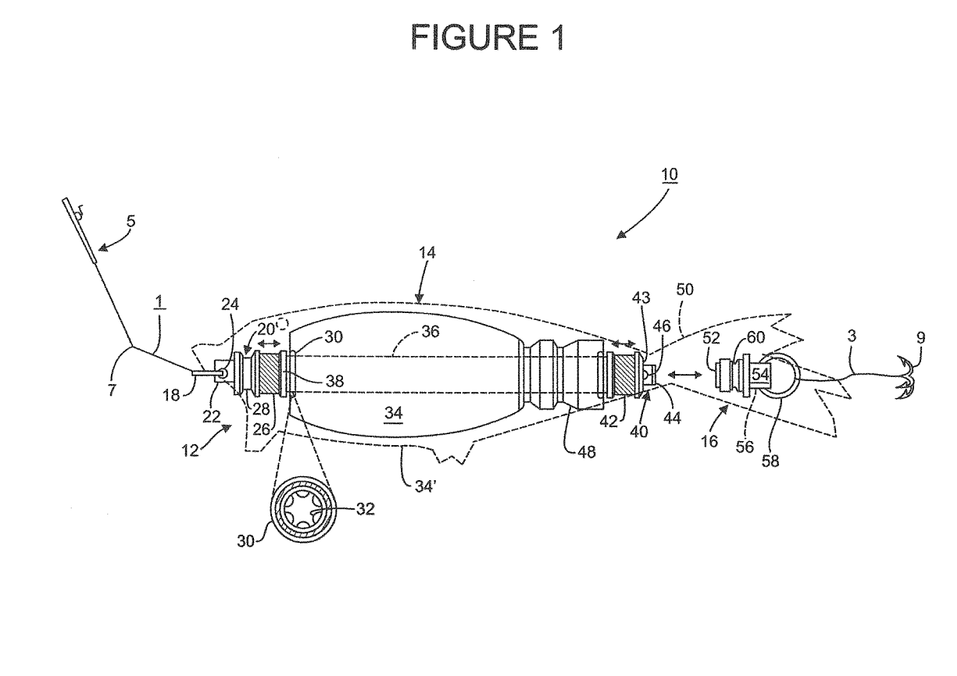
FIG. 1 is a partially exploded, perspective view of a leaderless quick release assembly according to an aspect of the disclosure, particularly showing operation of a hook end of the assembly (not to scale)

Turning now to FIG. 1, a leaderless, quick release fishing assembly is designated in general by the element number 10. The exemplary compound assembly 10 includes a quick release, rod-end subassembly 12, a mid-structure or lure portion 14, and a quick release, hook-end subassembly 16. As shown, the rod-end subassembly 12 is connected to a fishing leader or line 1 that depends from an end 7 of a rod and reel 5. More particularly, the line 1 may be connected to the rod-end subassembly 12 by a rigging ring 18, which is connected, in this example, to a quick connect female device 20 of the rod-end subassembly 12. As shown, the ring 18 is snapped or spiraled through a hole or aperture 24 of a ring end 22 of the quick connect female device 20.

With particular regard to the line 1 connected to the ring 18 in FIG. 1, the line 1 may be a type of fishing line commonly referred to as "fluorocarbon." Fluorocarbon fishing line is made of fluoropolymer PVDF (polyvinylidene fluoride) and is valued for its refractive index, which is similar to that of surrounding water. In other words, fluorocarbon is less visible to fish than ordinary line.

The line 1 may also include a "Bimini Twist." The Bimini Twist is a double line used in IGFA tournament fishing for added strength. Typically, when a pelagic predator fish is reeled near a capturing vessel, the fish becomes frightened and will "run" (i.e., swim away from the vessel), perhaps several times, before the fish can be captured. The movement of the running fish can create a snap force that can break a leader/line combination; therefore, this movement requires the extra strength of the Bimini Twist.

With further reference to the rod-end subassembly 12 in FIG. 1, the quick connect female device 20 may include a movable collar or slide 26. The collar 26 may be knurled or have a textured surface for easier grasping, especially when wet. As indicated by a double-headed arrow, the collar 26 may be moved back and forth along a shaft or neck 28 of the device 20. In this example, the collar 26 is urged by a spring constant in a direction of a ball-bearing end 30 of the device 20. Thus, a user must grasp the collar 26 and pull it toward the ring end 22 to release the rod-end subassembly 12, as depicted by the double-headed arrow and further described below.

As shown in the inset of FIG. 1, the ball-bearing end 30 of the device 20 includes one or more inwardly disposed ball bearings 32 that are urged by a spring constant to project into a raceway or race 39 (see FIG. 2), or into a plurality of channels, or into respective recesses of a male end 38 of a shaft 36. When seated in the race 39, the ball bearings 32 hold the subassembly 12 and lure portion 14 together. In a preferred embodiment, the ball bearings 32 permit the subassembly 12 and lure portion 14 to rotate or swivel relative to each other as the ball bearings 32 roll along the race 39 formed in the shaft 36.

More specifically, the shaft 36 shown in FIG. 1 is a quick connect, double-ended structure having, in this example, the male end or first end 38 and an opposing second or female end 40, the shaft 36 being useful in distributing across the fishing assembly 10 the tension imparted by a hooked fish. As shown, the female end 40 also includes a slide or collar 42, which moves back and forth under a spring constant along a shaft or neck 44, as depicted by a double-headed arrow. One benefit of this exemplary arrangement is that the user can pull the collar 42 towards the male end 38 rather than push the collar 42 in a direction of or into the mouth of the fish. Additionally, when dealing with large, dangerous fish, such as Blue Marlin or Sailfish, a relatively less expensive male connection 52 of the hook-end subassembly 16 may be released quickly along with the fish, while the relatively more expensive female end 40 is preserved. It should be understood that the foregoing arrangement is merely by way of an example. The male end 38 and the female end 40 could be interchanged, or both ends of the shaft 36 could be male, or both ends could be female.

FIG. 1 further shows that the shaft 36 may be surrounded by a fishing lure body or head 34, and may include a skirt or tail 50 that may be constructed unilaterally with the body 34, or separately therefrom. In a particular embodiment, the skirt 50 may be attached or connectable to the hook-end subassembly 16. Additionally, or alternatively, the body 34 and the shaft 36 may be of a unitary construction (an alternative body 34' is shown in phantom for clarity). As shown, the body 34 and the skirt 50 may be arranged to appear as a small forage fish to attract the desired larger predator fish, such as saltwater pelagic fish.

As introduced above and depicted by the double-headed arrow in FIG. 1, the female end 40 of the shaft 36 may be pulled towards the male end 38 to expose one or more ball bearings 46. As shown, the ball bearings 46 are arranged circumferentially about the neck 44. Similar to the ball bearings 32, when the collar 42 is released or in a relaxed state, the ball bearings 46 are urged by a spring constant to project into a race 60 of the male connection 52. More particularly, an inner surface 43 of the collar 42 urges the ball bearings 46 into the race 60. Accordingly, the mated surfaces may form an inner ring and an outer ring, between which ball bearings 46 (e.g., chrome plated steel ball bearings) may be sandwiched in a pressure fit. Pins or rollers may be used in place of or in addition to the ball bearings 46, and they may also be lubricated. In one example, the ring or neck 44 may be fixed, and the other connection 52 may be free to rotate 360 degrees or some portion thereof. Alternatively, the female end 40 may be constructed to swivel relative to the male end 52.

More specifically, the hook-end subassembly 16 mates to the female end 40 of the shaft 36 by sliding the male connection 52 into the neck 44. As the ball bearings 46 are urged onto the race 60, the user releases the collar 42, and its inner surface 43 contains the ball bearings 46 in the race 60 to hold the subassembly 16 and lure portion 14 together. To limit the rotation or swivel of the lure portion 14 and the subassembly 16, e.g., to 45 degrees clockwise-counterclockwise, the race 60 could be a series of troughs rather than a continuous race. Similarly, the ball bearings 32 and the race 39 and their related construction and operation may be comparable to the ball bearings 46 and their race 60.

Finally, FIG. 1 further shows that a ring end 54 of the subassembly 16 includes a ring hole 56 through which a rigging ring 58 is attached. A line 3 and a hook 9 are attached to the rigging ring 58 in a standard fashion. As suggested above, once a fish is hooked and reeled completely to the boat (due to the absence of a standard leader assembly), the attachment procedure may be reversed by pulling the collar 42 away from the mouth of the fish and simply releasing the fish with the relatively inexpensive hook 9 (and subassembly 16) still attached to the fish. Although the hook 9 may be made of a fast dissolving material to protect the fish, it is well known that the hook 9 also will rapidly work its way out of the fish. Once the subassembly 16 is released with the fish, the angler can quickly attach another subassembly 16 utilizing the mating features of the female end 40 and the male connection 52 and be fishing again within minutes or even seconds.

Figure 2:
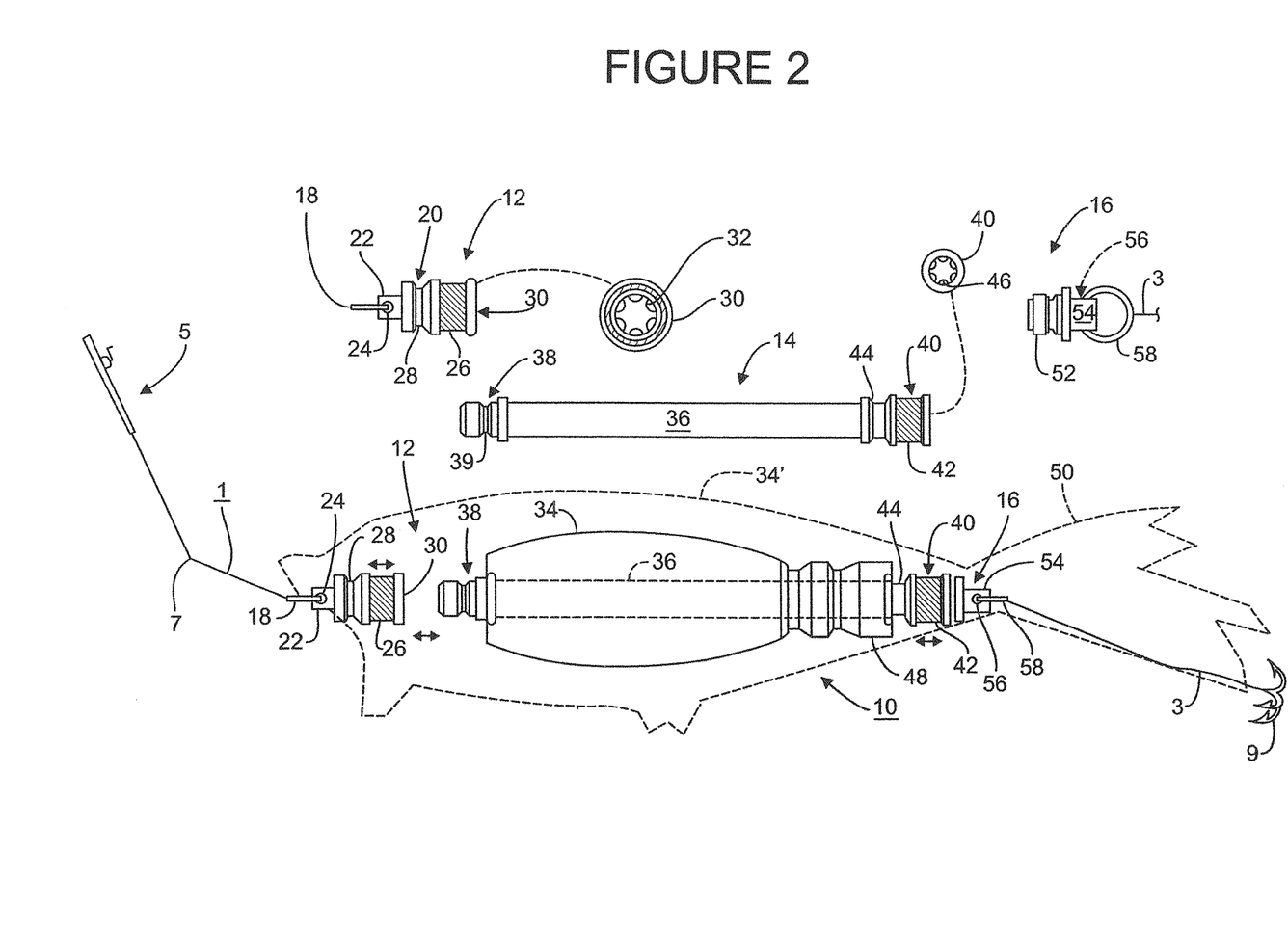
FIG. 2 is a partially exploded, perspective view of a leaderless quick release assembly as in FIG. 1, particularly showing operation of a rod end of the assembly (not to scale)

Turning now to FIG. 2, the subassembly 12, the lure portion 14 and the subassembly 16 of the quick release fishing assembly 10 are shown in an exploded view. More particularly, end views of the ball-bearing or female ends 30, 40 of the subassembly 12 and the lure portion 14 are shown with their respective ball bearings 32, 46 in a relaxed state. As indicated by the double-headed arrows, the male ends 38, 52 are mated to their respective female ends 30, 40 to hold the subassembly 12, the lure portion 14 and the subassembly 16 to form the quick release fishing assembly 10 as described above. In this example, the female end 30 is being released from the male end 38 in order to change the lure portion 14. This may be desirable if the angler wishes to change the appearance of the body 34 to depict a different type of prey fish or in the event that the body 34 has become damaged by a biting fish.

Figure 3:
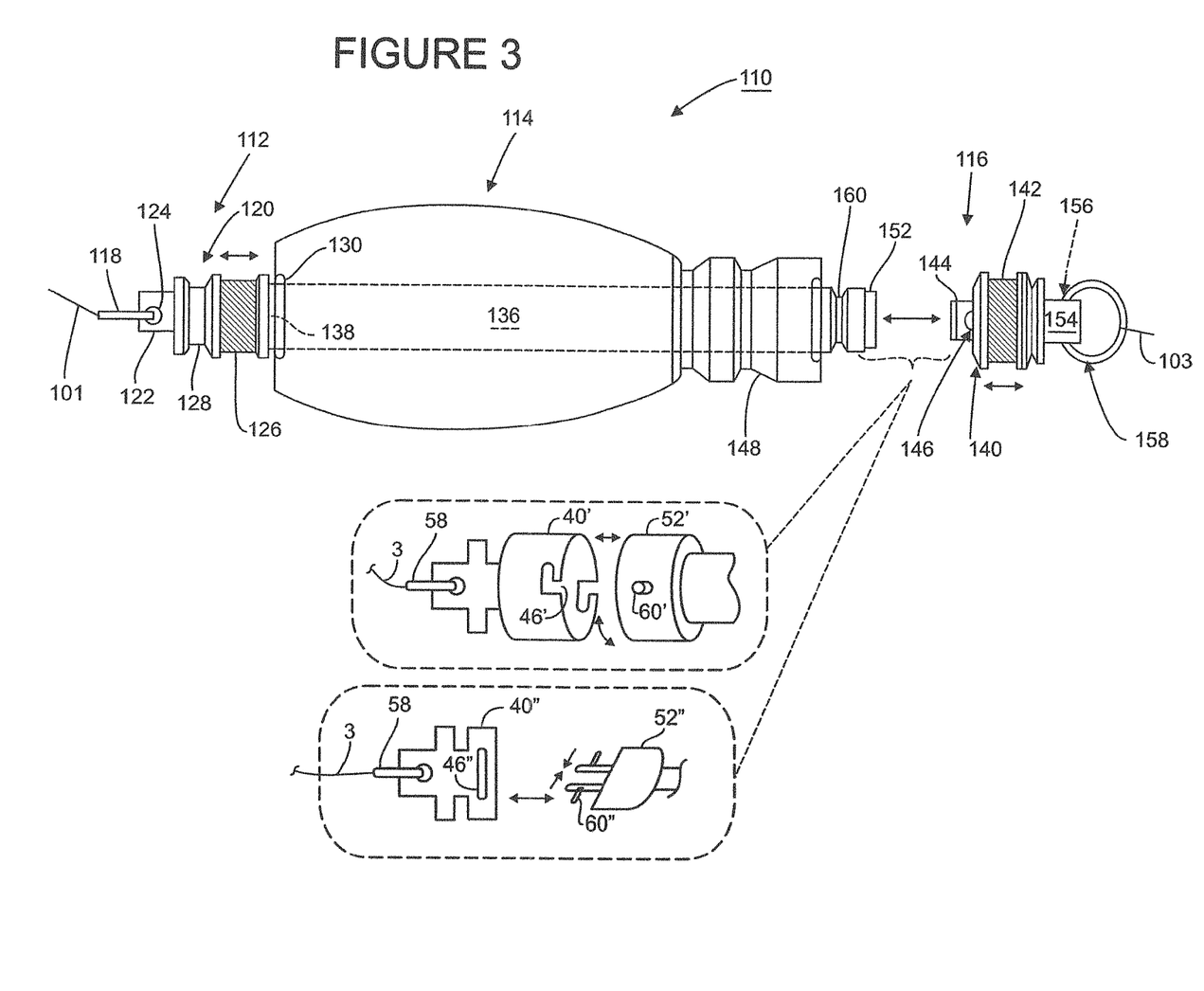
FIG. 3 is a partially exploded, elevational view of a leaderless quick release assembly according to another aspect of the disclosure, particularly showing operation of an alternative hook end of the assembly.

As noted above, the male ends 38, 52 and the female ends 30, 40 may be interchanged or reversed. Thus, the disclosure is not limited to the exemplary embodiments described above. For instance, FIG. 3 shows a quick release fishing assembly 110 that includes a quick release, rod-end subassembly 112, a mid-structure or lure portion 114, and a quick release, hook-end subassembly 116. In this embodiment, a shaft 136 of the lure portion 114 includes a male end 152 for mating with a female end 140 of subassembly 116. Otherwise, the components of the subassembly 112, the lure portion 114, and the subassembly 116 are similar to the components of the foregoing embodiment and reference is made thereto for a full and enabling disclosure of the embodiment of FIG. 3.

Also shown in FIG. 3 are exemplary quick release connectors that may be used in place of or in conjunction with the connectors described above. For instance, a male end 52' may be used with a female end 40' in a bayonet-type arrangement in which one or more prongs 60' may be slid into and twist-locked into one or more complementary channels 46'. Alternatively, a fork fitting may be use in which a male end 52" slides into a female end 40" wherein barbed forks 60" are pressed together and slid into respective keyholes 46". Thus, those skilled in the art will understand that the disclosure is not limited to ball bearing quick release arrangements and other arrangements such as squeeze-fit fittings or twist and lock mechanisms are contemplated by and are within the scope of the disclosure.

Figure 4:
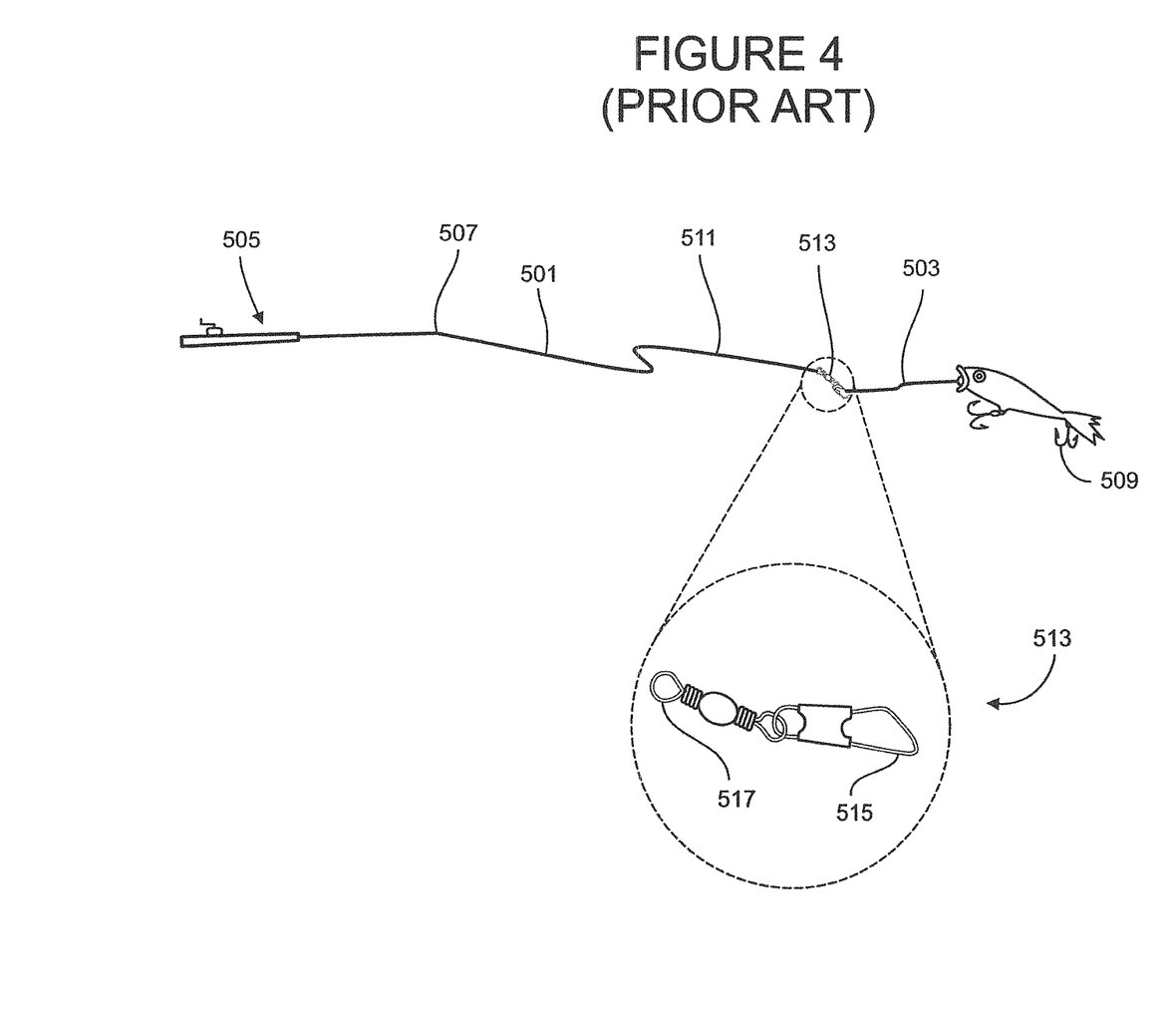
FIG. 4 is perspective view of a typical angler arrangement for targeting pelagic fish, particularly showing a conventional swivel necessitating a lengthy leader and requiring leadering.

Turning now to FIG. 4, a conventional fishing line 501 extends from a tip 507 of a rod and reel 505. As known in the industry, the line 501 is connected to a double line 511 that is permanently tied to a ring end 517 of a typical swivel 513. As shown, the conventional swivel 513 uses a press-open fitting 515 that is connected to as much as 30 feet of fluorocarbon line 503 tied to a lure 509. The angler using this conventional arrangement may only reel the swivel 513 up to the rod tip 507, which leaves as much as 30 feet of leader in the water that must be "leadered" in by a mate with the inherent dangers to the mate, harm to the fish and the like. Furthermore, if the fish has swallowed the lure 509, the mate either has to cut the line or change the entire assembly. For instance, the mate must take valuable time to open the fitting 515, remove the leader 503 and attach another lure 509. In either case, valuable time is taken, which increases potential harm to the fish.

By employing the embodiments of this disclosure, or their equivalents, rather than a conventional leader arrangement as shown in FIG. 4, the chances of an enjoyable and successful fishing trip are increased while safety and fish conservation issues are lessened. Specifically, the fishing assembly 10 as shown in FIG. 1 does away with a conventional swivel as the connection between the fishing line and the leader assembly. Because the swivel function is part of the fishing assembly 10, there is no conventional leader so the angler may reel the entire assembly 10 to the rod tip 7. Alternatively stated, the fishing assembly 10 incorporates the swivel at or near the head of each lure used; thus, the fluorocarbon 1 is connected directly from the rod and reel 5 to the fishing assembly 10.

Accordingly, the fishing assembly 10 ensures that a mate no longer has to "leader" a fish to the boat since the angler can reel the fish completely to the side of the boat and, further, to the rod tip 7. This also means that the mate no longer has to put a conventional leader next to his feet, risking knots and tangles and further risking that the leader will wrap around his feet or ankles. Additionally, the mate no longer has to make wraps with the leader around his wrists and hands to pull the fish closer, which heretofore risked injury and the possibility of being pulled overboard. Still further, the use of the fishing assembly 10 frees the mate for more important tasks. Opportunities also are increased to capture more fish in the critical vicinity of the boat because the angler can keep pressure on the fish.

In addition to increased safety and fishing success, since the angler can now wind the line, Bimini Twist, and the leader onto the reel, the fish does not have to struggle as much as when with the mate had to manually "leader" the fish to the boat. The fishing assembly 10 enables the mate or the angler to release the hook 9 from the assembly 10 very quickly, which permits the fish to swim away more quickly with the hook 9 in its mouth, leaving the fish with more energy and in better condition to fend off potential life-threatening predators. As known, fish have the ability to expel a hook from their mouth over time, causing the fish no long-term harm.

Still further, the fishing assembly 10 increases fishing speed. In tournament situations, a captured fish can be released much more quickly with fishing assembly 10 than with a typical leader assembly. In conjunction with the release, the angler has the ability to immediately attach another lure to the line eliminating the time it takes to "rig" another bait. This attachment option allows an angler to have another lure in the water sooner, which increases the chances of catching fish.

Additionally, in recreational fishing, if the angler desires to keep the fish, the mate is able to release the subassembly 16 with the fish still hooked on hook 9 into an icebox on the boat and again have another lure in the water sooner to increase the chance of catching more fish and sooner.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed:

1. A leaderless fishing assembly for use with a rod and reel, the leaderless fishing assembly comprising:
   a quick connection assembly comprising:
      a quick release fitting,
      a body connectable to the quick release fitting, and
      a collar movable from an attached position to a released position, the collar being rotatable 360 degrees relative to the quick release fitting in both the released position and the attached position,
   wherein the quick connection assembly includes a first end and a second end opposite the first end, wherein the body is closer to the second end than the first end when the body is coupled to the quick release fitting, wherein the quick release fitting is closer to the first end than the second end, and wherein the collar is configured to selectively release the body from the quick release fitting by moving the collar toward the first end of the quick connection assembly to the released position.

2. The leaderless fishing assembly of claim 1, wherein the quick release fitting is adapted to connect to a fishing line.

3. The leaderless fishing assembly of claim 2, wherein the body is rotatable 360 degrees relative to the fishing line.

4. The leaderless fishing assembly of claim 2, wherein the body is configured to extend at least partially into the quick release fitting when the body is coupled to the quick release fitting and the collar is in the attached position.

5. The leaderless fishing assembly of claim 1, wherein the quick release fitting comprises a ball bearing.

6. The leaderless fishing assembly of claim 5, wherein the body defines a raceway, and the collar is adapted to engage the ball bearing with the raceway, and wherein the collar is operable to release the body from the quick release fitting by disengaging the ball bearing from the raceway.

7. The leaderless fishing assembly of claim 1,
   wherein the quick release fitting is adapted to connect to a fishing line;
   wherein the body is rotatable 360 degrees relative to the fishing line and the quick release fitting;
   wherein the quick release fitting comprises a ball bearing;
   wherein the body defines a raceway, and the collar is adapted to engage the ball bearing with the raceway, and
   wherein the collar is operable to release the body from the quick release fitting by disengaging the ball bearing from the raceway.

8. The leaderless fishing assembly of claim 1, wherein the collar is spring biased toward the second end of the quick connection assembly.

9. The leaderless fishing assembly of claim 1, further comprising a lure portion, wherein the collar is configured to selectively release the body from the quick release fitting by moving the collar away from the lure portion.

10. The leaderless fishing assembly of claim 1, wherein the leaderless fishing assembly further comprises:
    a second quick connection assembly coupled to the quick connection assembly closer to the second end of the quick connection assembly than the first end of the quick connection assembly.

11. The leaderless fishing assembly of claim 10, wherein a lure portion is disposed between the quick connection assembly and the second quick connection assembly, and wherein the lure portion is detachable from the quick connection assembly, the second quick connection assembly, or a combination thereof.

12. The leaderless fishing assembly of claim 1, wherein the collar is adapted to be urged by a spring constant in a direction toward the second end.

13. The leaderless fishing assembly of claim 1, wherein the body is adapted to connect to a hook.

14. The leaderless fishing assembly of claim 1, wherein the body is configured to be a subcomponent of a lure.

15. The fishing assembly of claim 1, wherein the quick release fitting defines a female end, and wherein the body defines a male end.

* * * * *